March 24, 1970     R. J. MAAS ET AL     3,502,568
PROCESS FOR THE SEPARATION OF MIXTURES OF ORGANIC
COMPOUNDS BY ADDUCT FORMATION
Filed Oct. 26, 1967
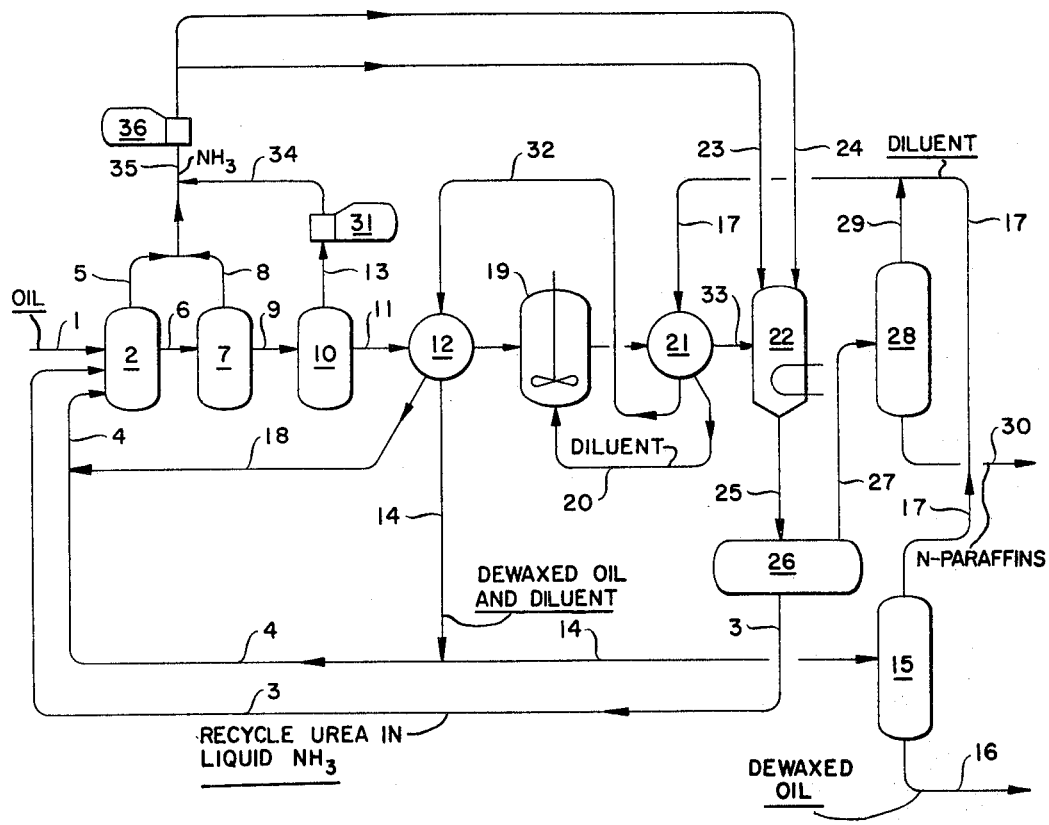
INVENTORS:
RUDOLPH J. MAAS
JOHAN G. A. BITTER
BY: *Marion N. Western*
THEIR ATTORNEY United States Patent Office 3,502,568
Patented Mar. 24, 1970

3,502,568
PROCESS FOR THE SEPARATION OF MIXTURES OF ORGANIC COMPOUNDS BY ADDUCT FORMATION
Rudolf J. Maas and Johan G. A. Bitter, Amsterdam, Netherlands, assignors to Shell Oil Company, New York, N.Y., a corporation of Delaware
Filed Oct. 26, 1967, Ser. No. 678,290
Claims priority, application Netherlands, Nov. 2, 1966, 6615430
Int. Cl. C10g *29/20, 43/02*
U.S. Cl. 208—25                            10 Claims

ABSTRACT OF THE DISCLOSURE

A process for dewaxing of oils by urea adduction wherein the oil is contacted with urea ammoniate at $NH_3$-pressure, the adduct formation between urea in statu nascendi and n-paraffins being induced by lowering its pressure and/or increasing the temperature; the adduct formed is separated from the oil and is subsequently decomposed into paraffins and urea or urea ammoniate by increasing the ammonia pressure and/or temperature, the urea or urea ammoniate being recycled.

This invention relates to a process for the separation of a mixture of organic compounds part of which may form solid adducts (complexes) with urea or thiourea. More particularly, this invention relates to a process for the dewaxing of hydrocarbon oils by the removal of paraffins from the oils by urea or thiourea adduction.

Processes for the separation of organic compounds by means of adduct formation are known in the art. They are applied on a technical scale in the petroleum industry for the separation of normal paraffinhydrocarbons from oil fractions, i.e. dewaxing. This is accomplished by bringing the oil into contact with urea or a urea solution, thereby forming solid adducts, which are separated from the remaining oil by filtration. The adducts thus obtained can be decomposed into paraffinhydrocarbons and urea or urea solution by heating or otherwise. In addition to n-paraffins the other organic compounds with straight, or mainly straight, chains can be separated from mixtures containing branched chain compounds by urea adduction.

In a similar manner, thiourea forms adducts with organic compounds possessing branched chains, such as isooctane, and with naphthenic hydrocarbons, such as cyclohexane.

Adduct formation is facilitated by the addition of a solvent; both to the mixture to be separated and to the urea or thiourea.

Known solvents useful in the dewaxing of mineral oils include low molecular weight paraffins, such as pentane, and naphthenic hydrocarbons, such as cyclohexane. Ketones, such as methyl ethyl ketone, methyl isopropyl ketone, and the like, as well as chlorine-containing hydrocarbons, such as dichloromethane and trichloroethane may also be used.

Several liquids have been proposed as solvents for urea, for example water; low molecular weight, monohydric and polyhydric alcohols, such as $C_1$–$C_5$ alcohols, ethyleneglycol and propyleneglycol; amines, such as mono-, di-, and triethanolamine; ketones, such as acetone, methyl ethyl ketone, methyl isopropyl ketone; nitriles, such as acetonitrile and acrylonitrile. In addition, organic anhydrides, such as acetic anhydride and liquid, inorganic compounds, such as liquid sulfur dioxide, carbon dioxide, hydrofluoric acid and ammonia are also useful as urea solvents.

As mentioned above the solvents for urea and the solvents for the mixture of hydrocarbons to be separated have the function of facilitating the course of the process. These solvents tend to reduce viscosity, so that stirring a mixture of oil and urea solution requires less energy and better contact between the oil and urea phases is attained. Furthermore, solvents improve the separation of the adduct from the oil as well as facilitating the recovery of the adducted compounds from the adducts.

According to the usual procedure a solution of the mixture to be separated is brought into contact by agitation with a saturated or a slightly supersaturated solution of urea or thiourea at 40–70° C. Under these conditions solid adducts are formed which, after separation from the liquid phase, can be decomposed by any known manner, e.g. by heating. It should be noted that of the various solvents proposed only a few have found application in practice. Thus, for the separation of normal paraffins from mineral oil fractions, chlorine-containing hydrocarbons, such as dichloromethane, are usually employed as solvents for the hydrocarbons, while water is mostly used as the solvent for urea.

While these prior art methods have proven successful to a certain degree there are obvious drawbacks to their utilization. For example, the contact time required for adduct formation is often rather lengthy. The purification of the adduct often removes only liquid impurities from the adduct but does not separate undesirable adducts which may form in minor amounts such as adducts of branched and cyclic chain hydrocarbons.

It has now been found that liquid ammonia has unexpected properties with respect to the formation of adducts of urea or thiourea with organic compounds and the purification thereof, and is capable of acting, not only as a solvent for urea or thiourea, but also as a reaction component. Under ammonia pressure urea reacts according to the overall equation

$$CO(NH_2)_2 + NH_3 \rightleftharpoons CO(NH_2)_2 \cdot NH_3$$

to form a crystalline compound. The ammoniate formed can easily be decomposed into solid urea and ammonia by reducing the ammonia pressure or by increasing the temperature. Thiourea reacts with ammonia in a similar way.

If decomposition of the ammoniate takes place in the presence of adductable organic compounds, solid adducts with the nascent urea or thiourea will spontaneously be produced, which adducts can be separated from the nonadducted liquid compounds by filtration or otherwise. The adducts separated can be decomposed by increasing the ammonia pressure and/or increasing the temperature.

The invention therfeore comprises a process for the separation of mixtures of organic compounds part of which can form solid adducts with urea or thiourea. It is accomplished by bringing the mixture of organic compounds into contact with urea or thiourea ammoniate under ammonia pressure. During the contact, by a decrease of the ammonia pressure and/or increase of the temperature, the ammoniate is decomposed to form solid urea or thiourea, which in statu nascendi spontaneously forms solid adducts with the adduct forming compounds. The adducts formed are separated from the non-adducted compounds by filtration or otherwise and the separated adducts are decomposed at an ammonia pressure and/or at a temperature higher than that at which the adduct was formed.

An essential feature of the process of the invention is the decomposition of urea or thiourea ammoniate in the presence of the mixture to be separated. This decomposition gives rise to the spontaneous formation of an adduct of the nascent urea or thiourea with the adduct-forming components of the mixture to be separated. As stated above, decomposition of the ammoniate is simply effected by reducing the ammonia pressure and/or increasing the temperature.

Urea ammoniate has been found to be stable at temperatures of 45° C. or lower at ammonia pressures complying with the following equation:

$$\log p_{NH_3} = -1.679 \cdot 10^3 \cdot \frac{1}{T} + 6.2138$$

wherein T represents the absolute temperature and $p_{NH_3}$ the ammonia pressure in atmospheres absolute. From this relation it is evident that the decomposition of the urea ammoniate and hence the adduct formation will take place at lower ammonia pressures and/or higher temperatures. In connection with the above-mentioned pressure/temperature relation of the system urea/ammonia, attention is drawn to a publication by E. Jänecke "Über das System $H_2O$—$CO_2$—$NH_3$" in Zeitschrift für Elektrochemie 36 (1930), No. 9, 645–654.

In a way similar to urea, thiourea ammoniate is stable at temperatures of 45° C. or lower at ammonia pressures that comply with the relation:

$$\log p_{NH_3} = -1.91737 \cdot 10^3 \cdot \frac{1}{T} + 6.78008$$

wherein T represents the absolute temperature and $p_{NH_3}$ is the ammonia pressure in atmospheres absolute.

Because of the agreement in the behavior of urea and thiourea with regard to the formation of ammoniate and the separation of organic compounds by adduct formation, the invention will be described hereinafter substantially with reference to the system urea/ammonia. However, the same description could apply to the use of thiourea as well.

For practical operation of the present process, the mixture of organic compounds to be separated is brought into contact with urea ammoniate at temperatures of 45° C. or lower at ammonia pressures which comply with the above-mentioned pressure/temperature relationship. The decomposition of the ammoniate, into urea, and ammonia and the adduct formation accompanying it is effected by a reduction in pressure and/or an increase in temperature.

In order to obtain a high rate of the adduction reaction it is advantageous to apply an excess of ammoniate—calculated on the amount of adductable compounds present in the starting material. A quantity of not more than 1.5 times the theoretically required amount of ammoniate should be sufficient. About 1.2 times of the theoretically required amount is generally adequate.

The residence time in the reactor or reactors required for complete or substantially complete adduction to be attained is dependent upon the conditions applied, such as temperature and intensity of the contact between the phases, as well as upon the nature of the starting material, such as the average molecular weight of the adductable compounds. In general, it may be said that the contact times required for the adduction are shorter than according to the conventional procedure and that contact times of from 1 to 30 minutes are sufficient. The shortness in residence time is surprisingly attributed to the fact that the rate of adduct formation via the ammoniate is considerably higher than that according to conventional methods.

The mixture to be separated is preferably brought into contact with the ammoniate at a temperature between 0 and 40° C. and at an ammonia pressure, adapted to it according to the above-mentioned temperature pressure relationship. In general pressure of from 0.5–7 atm. abs. are sufficient. Temperatures lower than 0° C., e.g. down to —20° C., can also be used if desired.

The ammoniate can be brought into contact with the mixture of organic compounds to be separated in the form of a slurry of fine-disperse solid ammoniate particles in a low-viscosity liquid, such as a low molecular weight hydrocarbon, e.g. cyclohexane or toluene, which does not form adducts with urea.

The urea ammoniate may be prepared starting from a saturated or essentially saturated solution of urea in liquid ammonia, by decreasing the ammonia pressure, at a temperature of 45° C. or lower, to a value corresponding to the relation:

$$\log p_{NH_3} = -1.679 \cdot 10^3 \cdot \frac{1}{T} + 6.2138$$

wherein $p_{NH_3}$ and T have the above-mentioned meaning.

Thiourea ammoniate may be prepared in the same manner, starting from a saturated or essentially saturated solution of thiourea in liquid ammonia, by decreasing the ammonia pressure, at a temperature of 45° C. or lower, to a value corresponding to the relation:

$$\log p_{NH_3} = -1.91737 \cdot 10^3 \cdot \frac{1}{T} + 6.78008$$

After having been separated from the liquid phase containing the non-adducted components of the starting material the adducts can be decomposed by application of a higher ammonia pressure and/or a higher temperature than that at which the adduct was formed.

It is apparent from the above description that it is possible to separate mixtures of organic compounds in a simple manner, with the aid of a solution of urea in liquid ammonia. By adjusting the ammonia pressure and/or the temperature the process can be made to proceed in its various stages, viz:

(1) The ammoniate may be formed by starting from a urea solution in liquid ammonia at a temperature of 45° C. or lower by reducing the ammonia pressure to a value corresponding with the relation given in the above equation.

(2) The decomposition of the ammoniate in urea and ammonia may take place in the presence of the mixture to be separated by further reducing the ammonia pressure and/or by increasing the temperature. Under these conditions adducts are formed spontaneously.

(3) The decomposition of the adducts separated may be accomplished by increasing the ammonia pressure and/or by increasing the temperature.

If desired, stages 1 and 2, i.e. the ammoniate formation and the ammoniate decomposition followed by the adduct formation, can be made to proceed simultaneously.

The present process is particularly suited to continuous operation. To this end, a liquid mixture of organic compounds, with or without a solvent together with a solution of urea in liquid ammonia, is continuously fed through one or more reactors connected in series. In the reactors which are maintained at a temperature of 45° C. or lower and at an ammonia pressure of 8 atm. abs. or lower urea ammoniate is formed. The ammoniate is decomposed into solid urea and ammonia in the same or in one or more, subsequent reactors and spontaneously forms adducts with the adductable organic mixture. The solid adducts formed with urea are separated from the liquid phase in a continuously operating separator, such as a rotating filter. The liquid phase, containing the non-adducted compounds from the starting material is disposed of in any desired manner. For example, this liquid can be further separated into its component parts by distillation. The adducts separated are subsequently decomposed by the addition of ammonia under pressure and/or by increasing the temperature. The adduct-forming compounds of the urea-containing ammonia solution are then separated, e.g. in a settling tank and the ammonia solution is recycled back to the process.

The process according to the invention is generally applicable to any mixtures of organic compounds part of which can form solid adducts with urea or thiourea. More particularly the process is adaptable to the separation of hydrocarbon mixtures containing straight-chain hydrocarbons, or substantially straight-chain hydrocarbons in addition to branched hydrocarbons. Examples of hydrocarbon mixtures are those obtained by direct distillation of paraffinic oils or oil fractions, such as gasoline, kerosine, gas oil, lubricating oil and higher-boiling fractions. Also suitable are cracked hydrocarbon mixtures such as heavy cycle oils from a catalytic cracking plant, as well as raffinates obtained in the treatment of such an oil with a solvent selective for aromatics, such as furfural or sulfolane. The process is particularly suitable for the preparation of kerosines, gas oils and lubricating oils having a low freezing point or pour point. A distinct advantage of the process of this invention over conventional processes is that hydrocarbon oil fractions containing residual components can be treated without difficulty. In conventional urea processes the working up of oils of this kind is, if at all, extremely difficult.

As pointed out above, the process can be promoted by adding a diluent to the starting material to reduce its viscosity. This applies particularly to viscous hydrocarbon oil fractions. Suitable diluents include low-molecular weight hydrocarbons, such as pentane, hexane, heptane or octane or mixtures containing these hydrocarbons, such as gasoline fractions which do not form adducts under the conditions applied.

The following description illustrates the continuous operation of the process according to the invention. The starting material is a high boiling hydrocarbon oil fraction, which, together with a solution of urea in liquid ammonia originating from the process, is passed through two reactors connected in series. The hydrocarbon oil enters at a temperature of 80° C., while the urea solution is introduced at a temperature of 70° C. and an ammonia pressure of 19.6 atm. abs. In the reactor a temperature of 30° C. and an ammonia pressure of 4.7 atm. abs. is maintained by evaporation of liquid ammonia. These conditions are suitable for the formation of both ammoniate and urea-hydrocarbon adducts.

It should be noted that in the continuous operation of the process the contents of the first reactor primarily consist of a suspension of solid adduct, solid urea ammoniate and urea in statu nascendi, in a solution of partly dewaxed oil.

A particularly notable advantage of the process of the invention lies in the fact that the various stages of the process, viz. the formation of the ammoniate, the decomposition of the ammoniate followed by adduct formation, and the decomposition of the adducts, may all be made to proceed isothermally or substantially so by merely adjusting the ammonia pressure. The formation and decomposition of ammoniate and the adduct formation is caused to proceed by gradual or stepwise reduction of the ammonia pressure and the decomposition of the adduct takes place by increasing the ammonia pressure.

The special properties of the liquid ammonia/urea system further provide advantages in the purifying of the adducts prepared by the present process or by a conventional route.

In essence, the usual purification of the adduct consists in the removal of liquid impurities containing non-adductable components of the starting mixture clinging on or occluded in the adduct crystals. The liquid impurities are removed by dispersing the adduct in a finely divided state in a diluent for the non-adductable components. The adduct is subsequently separated from the diluent which retains the contaminants in solution.

In contrast to the conventional purification mentioned above which is based merely upon the washing of the adduct crystals to remove liquid contaminants the purification in the presence of liquid ammonia is carried out in quite a different manner. The purification in the presence of ammonia is based upon a change in the composition of the adducted compounds rather than upon a washing step.

It is known that urea is capable of forming adducts, not only with n-paraffin hydrocarbons, but also with iso-paraffins and cyclic compounds having a long, straight carbon chain. If a mixture of such adducts is taken up in a hydrocarbon diluent as in the convention process, a new equilibrium tries to establish itself between the hydrocarbons in the adduct and those in the diluent; however, this process develops very slowly.

It has now been found that adduct mixtures containing adducts of n-paraffin hydrocarbons, and adducts of isoparaffins and/or cyclic compounds with a relatively long, straight carbon-chain, can be purified by first suspending the adduct mixture in a hydrocarbon diluent and subsequently causing the adducts to decompose with the aid of ammonia under pressure. The organic compounds released, such as n-paraffins, isoparaffins and cyclic hydrocarbons then dissolve in the diluent and the urea released combines with ammonia to form solid ammoniate, which is present in the hydrocarbon solution as a suspension. Through subsequent reduction of the pressure the process is reversed, i.e. adducts are again formed; however, the n-paraffin hydrocarbons are preferentially adducted, while the isoparaffins and the cyclic compounds with long, straight carbon chains form adducts to a much lesser extent. The adducts formed are subsequently separated from the diluent, which contains dissolved branched and cyclic compounds, decomposed and n-paraffins and urea are recovered in the manner described above.

This adduct purification step is very attractive, since the decomposition of the adducts and their reformation can be effected under small pressure differentials and only small amounts of ammonia are needed.

The present purification process is not only applicable to adduct mixtures of hydrocarbon oil fractions, but is suitable for any mixtures containing, in addition to adducts of compounds with exclusively or substantially straight carbon chains, adducts of compounds with branched chains and/or cyclic compounds with a relatively long, straight carbon chain.

EXAMPLE

A hydrocarbon oil distillate that had been obtained by vacuum distillation of a residual oil fraction from a paraffinic crude oil, having a boiling range of 350–480° C. and a paraffin content of 20%, was separated, in a continuously operating process as schematically represented in the attached drawing into a n-paraffin fraction and an oil fraction with a reduced paraffin content.

The starting oil was supplied via line 1 to stirred reactor 2 at a temperature of 80° C. under continuous flow conditions. To this reactor was added, via line 3, a solution of recycle urea in liquid ammonia. A stream of recycle oil-containing diluent was supplied via line 4. The diluent, which in this case was a $C_8$ hydrocarbon, had as its function the reduction in viscosity of the starting oil. The temperature in the reactor was brought to 30° C. by evaporating part of the liquid ammonia, the gaseous ammonia thus formed being carried off via line 5.

Under the applied conditions of temperature (30° C.) and pressure (4.7 atm. abs.) crystalline urea ammoniate was formed in the reactor, from which crystalline urea was formed in situ from the ammoniate and spontaneously formed adducts with the n-paraffin hydrocarbons present in the oil solution.

The reaction mixture was continuously passed from reactor 2 via line 6 to reactor 7, where the adduct formation was completed under the same conditions of temperature and pressure as in reactor 2. Gaseous ammonia was carried from reactor 7 via line 8. From reactor 7 the suspension of solid adduct in oil solution was passed via line 9 into flash chamber 10. There the ammonia pressure was released to 1 atm. abs., and the slurry was carried off via line 11 and filtered and washed on rotating pressure filter 12. Gaseous ammonia was carried off from flash chamber 10 via line 13, to be further applied in the process after compression in compressor 31. The solution of dewaxed oil in $C_8$ diluent draining from filter 12 via line 14 was split into two fractions one of which was led via line 4 to reactor 2 and the other was fed into distillation column 15 where, at the bottom, the dewaxed oil was obtained via line 16. At the top of column 15 the $C_8$ hydrocarbon was recovered and was recycled into the process via line 17. The adduct retained on filter 12 was given an after-wash with an oil-containing diluent originating from a second filtration section 21 via line 32. The wash liquid draining from filter 12 was recycled to reactor 2 via lines 18 and 4 to serve as a diluent for the feed oil. In order to remove the occluded oil solution from the adduct crystals, the washed adduct coming from filter 12 was suspended in $C_8$ hydrocarbon, supplied via line 20, in stirred vessel 19. The slurry obtained was subsequently fed over the rotating pressure filter 21 to separate the adducts from the diluent. After separation the adduct filtered off was washed with $C_8$ hydrocarbon supplied via line 17. The adduct thus purified was then transported to vessel 22 by means of line 33 to be decomposed with the aid of liquid ammonia into liquid n-paraffins and a homogeneous solution of urea in ammonia. Decomposition took place at a temperature of 70° C. and a pressure of 19.6 atm. abs. The ammonia supplied to vessel 22 was fed via line 23 and line 24, respectively and originated by compressing, in compressor 36, the gaseous ammonia carried off from reactors 2 and 7, as well as from flash chamber 10 by means of lines 5, 8 and 34 into line 35.

The mixture of liquid n-paraffins and urea-ammonia solution was carried from vessel 22 via line 25 and separated in settling vessel 26. The wax phase was fed into distillation column 28 via line 27 for the removal of any $C_8$ hydrocarbon left, which was recycled to the process via lines 29 and 17. The n-paraffins were obtained from the bottom of column 28 via line 30. The urea ammonia solution separated from vessel 26 was recycled to the process via line 3.

We claim as our invention:

1. A process for the separation of mixtures of organic compounds, at least part of which are capable of forming solid adducts with an adduct former consisting of urea or thiourea which comprises:
  (a) bringing the mixture to be separated into contact with a member selected from the group consisting of urea ammoniate and thiourea ammoniate under ammonia pressure,
  (b) decomposing the ammoniate in the presence of the mixture to be separated by (1) decreasing the ammonia pressure (2) increasing the temperature or both thereby forming a member selected from the group consisting of urea and thiourea which spontaneously forms solid adducts with the adductable compounds in the mixture to be separated,
  (c) separating the adduct crystals from the non-adducted compounds,
  (d) decomposing the adducts by (1) an increase in ammonia pressure to a pressure greater than that at which the adducts were formed, (2) an increase in temperature to a temperature greater than that at which the adducts were formed or both thereby forming a mixture of adductable organic compounds, a member selected from the group consisting of urea and thiourea and ammonia and
  (e) separating the adductable organic compounds from the mixture.

2. A process according to claim 1 wherein the adduct former is urea.

3. A process according to claim 2 wherein step (a) is carried out at a temperature of 45° C. or lower and at an ammonia pressure corresponding to the equation $$p_{NH_3} = -1.679 \cdot 10^3 \cdot \frac{1}{T} + 6.2138$$

wherein $p_{NH_3}$ represents the ammonia pressure in atmospheres absolute and T represents the absolute temperature.

4. A process according to claim 3 wherein the temperature in step (a) is between 0 and 40° C. and the ammonia pressure is between about 0.5 and 7 atmospheres absolute.

5. A process according to claim 4 wherein the amount of ammoniate applied is between 1.0 and 1.5 times the amount needed to form adducts with the adductable compounds in the mixture to be separated.

6. A process according to claim 4 wherein the contact time between the mixture to be separated and the ammoniate of step (a) and the urea of step (b) is from 1 to 30 minutes.

7. A process according to claim 4 wherein the process is carried out in the presence of a hydrocarbon diluent which does not form adducts with urea under the conditions applied.

8. A process according to claim 4 wherein the mixture to be separated is a hydrocarbon oil fraction selected from the group consisting of paraffinic crude, gasoline, kerosine, gas oil, lubricating oil and heavy cycle oil.

9. A process according to claim 4 wherein the steps are carried out under substantially isothermal conditions by varying the ammonia pressure.

10. A process for the purification of mixtures of hydrocarbon adducts of urea containing straight, branched and cyclic hydrocarbon chains, and the separation of the straight chain hydrocarbon adducts therefrom by
  (a) suspending the adduct mixture in a hydrocarbon diluent, which under the conditions applied does not form adducts with urea,
  (b) decomposing the adducts in the hydrocarbon diluent by means of ammonia under pressure, thereby releasing the adducted hydrocarbons which dissolve in the diluent, and urea which forms solid urea-ammoniate,
  (c) decreasing the ammonia pressure to decompose the ammonia thereby releasing urea which preferentially forms adducts with straight chain hydrocarbons, and
  (d) separating the straight chain hydrocarbon adducts from the diluent containing dissolved branched and cyclic chain hydrocarbons.

References Cited

UNITED STATES PATENTS

| | | | |
|---|---|---|---|
| 2,681,904 | 6/1954 | Hyer et al. | 260—96.5 |
| 2,686,755 | 8/1954 | Hess et al. | 208—25 |
| 3,163,632 | 12/1964 | Leas et al. | 208—25 |

HERBERT LEVINE, Primary Examiner

U.S. Cl. X.R.

260—96.5